(12) United States Patent
Eller et al.

(10) Patent No.: US 8,248,964 B2
(45) Date of Patent: Aug. 21, 2012

(54) PROTOCOL LINK LAYER

(75) Inventors: Riley Eller, Seattle, WA (US); Frank Laub, Seattle, WA (US); Jeremy Bruestle, Seattle, WA (US); Mark L Tucker, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 0 days.

(21) Appl. No.: 13/398,751

(22) Filed: Feb. 16, 2012

(65) Prior Publication Data

US 2012/0151069 A1 Jun. 14, 2012

Related U.S. Application Data

(63) Continuation of application No. 12/278,145, filed as application No. PCT/US2007/061487 on Feb. 1, 2007, now abandoned.

(60) Provisional application No. 60/763,959, filed on Feb. 1, 2006, provisional application No. 60/763,977, filed on Feb. 1, 2006, provisional application No. 60/764,013, filed on Feb. 1, 2006.

(51) Int. Cl.
*H04L 12/26* (2006.01)
*H04L 12/66* (2006.01)
(52) U.S. Cl. ...................................... 370/252; 370/352
(58) Field of Classification Search ....................... None
See application file for complete search history.

(56) References Cited

U.S. PATENT DOCUMENTS

2002/0075854 A1  6/2002  Kumar et al.
2005/0089024 A1  4/2005  Bergeron et al.

OTHER PUBLICATIONS

Brumfield, Robert, "CoCo helps diverse devices talk to each other", Dec. 15, 2005, eSchool News.

*Primary Examiner* — Clemence Han
(74) *Attorney, Agent, or Firm* — Lowe Graham Jones PLLC

(57) ABSTRACT

A link is a software abstraction that represents a direct connection between two CoCo nodes. The link layer detects the presence of neighboring devices and establishes links to them. A protocol abstraction layer converts data frames that arrive on network interfaces into packet objects used by the COCO Protocol Suite.

17 Claims, 19 Drawing Sheets

T is the ack-interval

| Type (1) | Encrypt (1) | Packet Size (14) |

*FIG. 4*

PROTOCOL LINK LAYER

PRIORITY CLAIM

This application is a Continuation of U.S. Utility Application entitled "Protocol Link Layer," having application Ser. No. 12/278,145, filed on Aug. 1, 2008, and completed on May 18, 2009, which is a U.S. National Stage application of International Application No. PCT/US07/61487, entitled "Protocol Link Layer," filed Feb. 1, 2007, which claims the benefit of U.S. Provisional Application, entitled "Protocol Link Layer" having Application Ser. No. 60/763,959, filed Feb. 1, 2006, which is related to U.S. Provisional Application entitled "Protocol Circuit Layer" having Application Ser. No. 60/763,977, filed Feb. 1, 2006, and U.S. Provisional Application, entitled "Congestion Management and Latency Prediction in CSMA Media" having Application Ser. No. 60/764,013, filed Feb. 1, 2006. Accordingly, the present application claims priority to and the benefit of the filing dates of U.S. application Ser. No. 12/278,145, International Application No. PCT/US07/61487, Provisional Application No. 60/763,959, Provisional Application No. 60/763,977, and Provisional Application No. 60/764,013, which are all incorporated by reference herein in their entirety.

BACKGROUND

Computers have been networked to exchange data between them for decades. One important network, the Internet, comprises a vast number of computers and computer networks interconnected through communication channels. The Internet is used for various reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (ie., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over handheld, wireless devices, such as cell phones and portable computers (e.g. PDA's). All of these protocols provide easier ways to provide information to people via various data processing devices. Many other protocols and means for exchanging data between data processing devices continue to develop to further aid the exchange of information.

BRIEF DESCRIPTION OF THE DRAWINGS

FIG. 4 is a block diagram illustrating a CoCo protocol header in some embodiments.

DETAILED DESCRIPTION

The Link Concept

A link is a software abstraction that represents a direct connection between two CoCo nodes. The principle task of the link layer is to detect the presence of neighboring CoCo devices and establish links to them.

Description of Link Layer Protocol Functionality

Link establishment employs a variation on the traditional three-way handshake protocol (packets containing "hello," "hello-ack," and "final-ack"; see [lSI]). Link establishment includes the negotiation of an encoding method and a Diffie-Hellman key exchange so that all communication sent over the link may be cryptographically check-summed [S]. This ensures consistency of identity; that is, a node is guaranteed that all packets received over a link came from the node with which it established that link.

Once a link is established, the link layer
Relays packets between the network interface layer and higher protocol layers (the routing and circuit layers).
Monitors Quality of Service (QoS) statistics and is able to report these to higher protocol layers.
Supports multicasting by suppressing redundant packet transmission across a single network interface.
Performs fragmentation when packet sizes exceed the network interface Maximum Transmission Unit (MTU).
Closes inactive links to free system resources for new link requests.

The Link Layer in the Context of Other Protocol Layers

Figure 1:
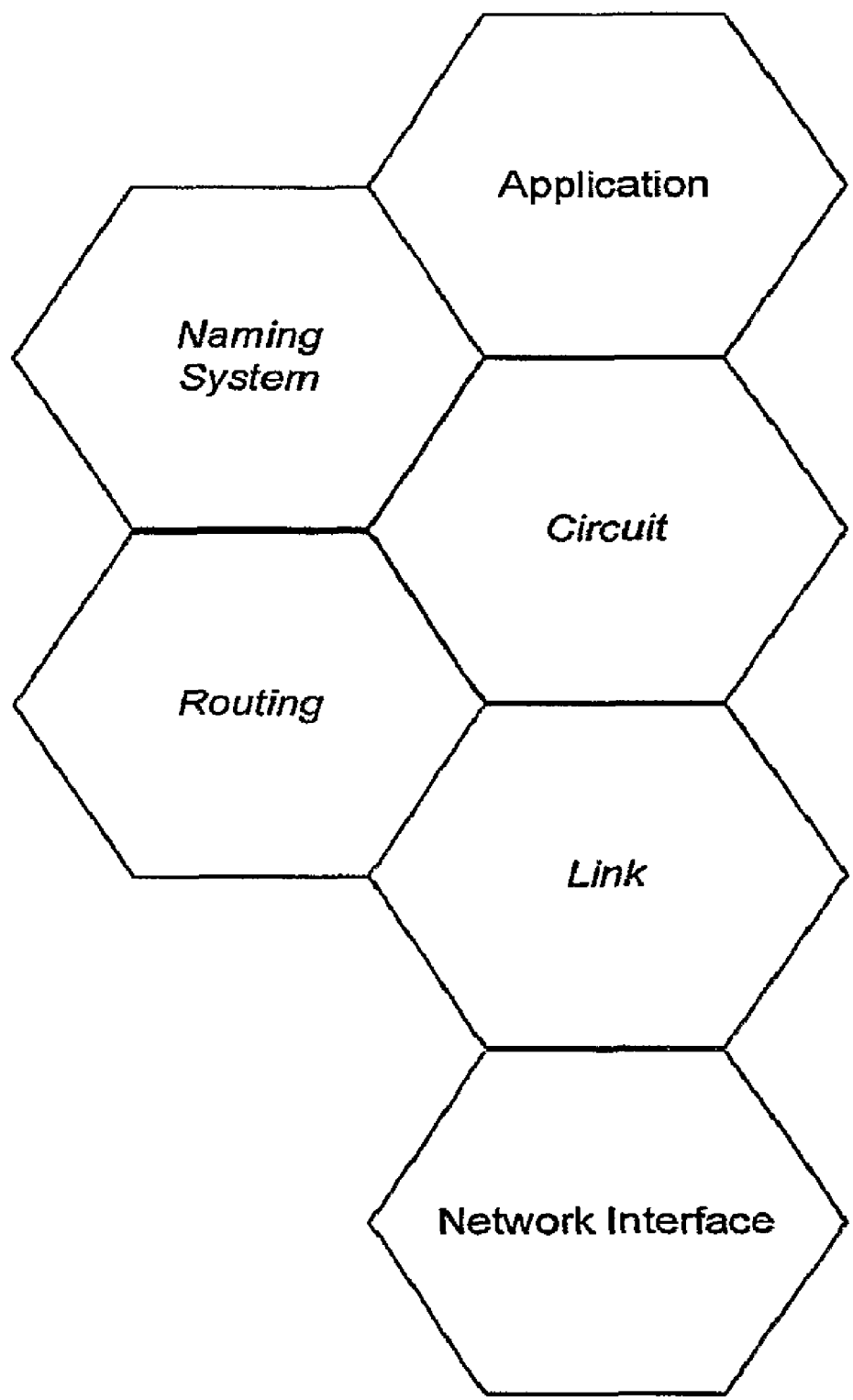
FIG. 1 is a block diagram illustrating the relationship of the link layer to the other layers of the CoCo Protocol Suite in some embodiments.

FIG. 1 illustrates the relationship of the link layer to the other layers of the CoCo Protocol Suite. The CoCo Protocol Suite layers are shown with italic font in FIG. 1.

More details about the routing layer, circuit layer, and naming system layer may be found, respectively, in commonly owned U.S. patent application Ser. No. 12/160,597 (hereinafter referred to as "[BLMS]"), commonly owned U.S. patent application Ser. No. 12/278,144 (hereinafter referred to as "[BMV]"), and commonly owned U.S. patent application Ser. No. 12/160,599 (hereinafter referred to as "[BELM]"). The network interface layer is the operating system's device driver for a physical network device such as an Ethernet card.

Components of the Link Layer

Figure 2:
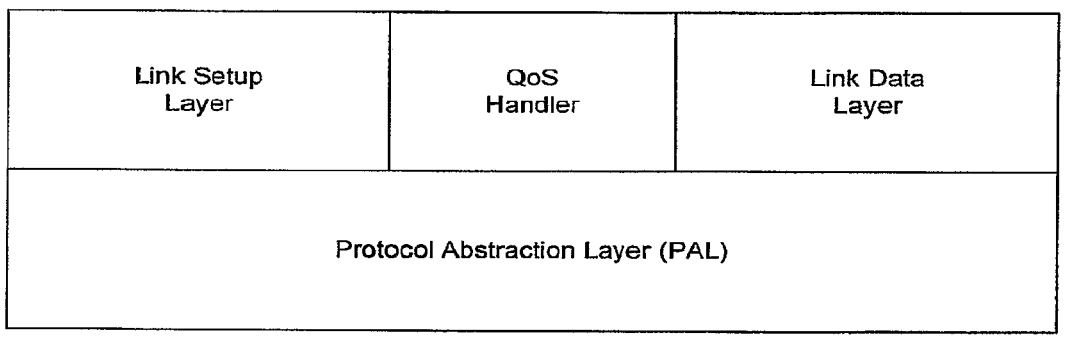
FIG. 2 is a block diagram illustrating the relationship of various layers in the CoCo Protocol Suite in various embodiments.

FIG. 2 is a block diagram illustrating the relationship of various layers in the CoCo Protocol Suite. The link layer connects to the network interface layer and is comprised of the following components:

The Protocol Abstraction Layer (PAL), which converts the incoming data frames that arrive on network interfaces into packet objects used by the CoCo Protocol Suite.
The link setup sublayer, which establishes links with neighboring nodes in a CoCo network.
The link data sublayer, which transfers data across established links.
The QoS handler, which monitors the quality of links.

Figure 3:
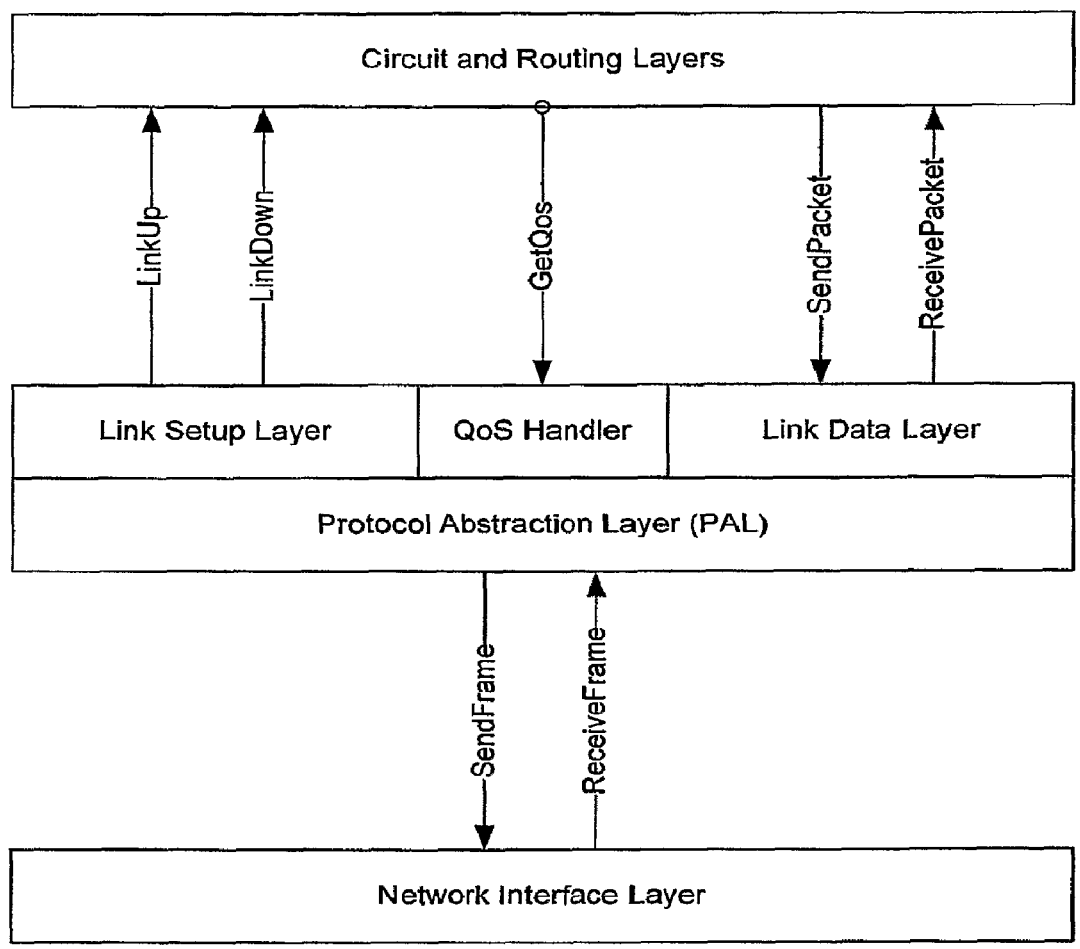
FIG. 3 is a block diagram illustrating a detailed view of the link layer protocols in some embodiments.

FIG. 3 gives a more detailed view of the link layer protocols, including their interfaces. Each arrow in FIG. 3 represents a function call that is part of the interface. An arrow from layer A to layer B indicates a procedure or function in layer B is called from layer A. A circle at the tail of an arrow indicates a function that returns a value to the caller.

Link Layer Interface

The link layer interface offers the following functions, which the routing and circuit layers use to determine the presence and absence of links, and to send and receive packets over links:

LinkUp(link)
The link layer calls LinkUp(link) to inform the circuit and routing layers that a link has opened.
LinkDown(link)
The link layer calls LinkDown(link) to inform the circuit and routing layers that a link has closed.
Receive(packet,link)
The link layer calls Receive(packet, link) to inform the circuit and routing layers that a packet arrived over a link.
Send(packet, link)
The circuit or routing layer calls Send(packet, link) to send a packet over a link.

GetQos(link)
The circuit or routing layer calls GetQos(link) to obtain the QoS metrics associated with the given link.

Link Layer Packet Types

After the PAL parses the incoming data frames, it discards the network interface header; the data that remains is either a link setup packet or a link data packet.

Link setup packet: A link setup packet contains information necessary to establish a link. Its packet header is the entire link setup packet; there is no separate data portion of a link setup packet. Link setup packets are used only within the link layer.
Link data packet: In addition to actual user data (and any data relevant to higher protocol layers), link data packets contain extra fields to handle data packet acknowledgements, data packet fragmentation, and a cryptographic checksum. Link data packets are forwarded to the routing and circuit layers.

Protocol Abstraction Layer

The Protocol Abstraction Layer (PAL) of the link layer parses the incoming data frames that arrive on network interfaces (such as Ethernet or Satellite interfaces), uses that data to create a CoCo header and address translation table, and then discards the header of the network interface data frame. After the network interface header is discarded, the data that remains is either a link setup packet or a link data packet. The link layer examines these packets and sends link setup packets to the link setup sublayer and link data packets to the link data sublayer.

To summarize, the PAL:
Gets data frames from a network device or connection.
Constructs a CoCo header and address translation table that capture relevant information from the network interface layer (which is typically a device driver for a network device such as an Ethernet card).
Removes and discards the network interface layer header.
Passes the modified packet to either the link setup sublayer or the link data sublayer.

The CoCo Header and Address Translation Table

The CoCo header and address translation table are replacements for the header from the network interface layer. The PAL creates them after receiving a packet from the network interface. When a frame arrives from any physical network interface, the PAL reads the frame header to construct a CoCo header and add an entry to its address translation table.

The address translation table exists only in memory and is used only by the PAL. The PAL extracts the source address from the frame header and associates it with the universal node identifier (UNI) of the source node, storing the association in an address translation table. An address translation table is created for each type of physical transport used by the node. The UNI is then used throughout the CoCo Protocol; the address translation table may be needed only when data is sent to the network interface layer. (See [BLMS] for more information about UNIs.)

Figure 4:
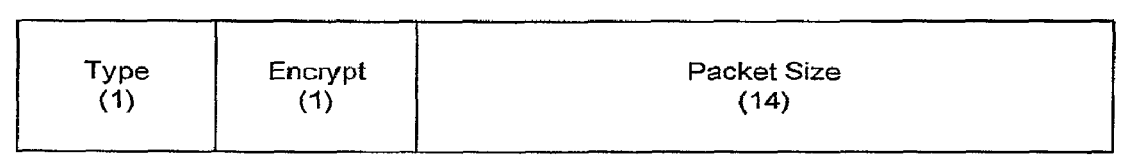

The format of the CoCo header is uniform—it is the same regardless of which interface type the packet arrived on. The CoCo header is stored in memory and is available to higher protocol layers; its structure is shown in FIG. 4, with the bit size of each field given in parentheses.

The Type field describes the type of packet that follows the CoCo header—either a link setup packet or a link data packet. The Encrypt field describes whether or not the packet is encrypted. Since encryption may not happen until after a link has been established, all link setup packets are unencrypted; all broadcast packets are also unencrypted because of the difficulty of encrypting a message that would be decrypted by multiple nodes. The Packet Size field is the size in bytes of the entire packet that follows the CoCo header.

CoCo nodes also send the CoCo header over the physical network interface to act as a check on the packet integrity. After the PAL composes the CoCo header in the usual manner, the results are checked against the CoCo header that was sent over the wire; if they do not match, the packet is discarded.

Transports that the PAL Supports

The PAL supports numerous network interface formats, including:

Ethernet (IEEE 802.3)
Token-ring (IEEE 802.5)
Wi-Fi (IEEE 802.11)
Synchronous Optical Network (SONET)
Asynchronous Transfer Mode (ATM)
Satellite Because other transport technologies use the network interface formats listed previously, the link layer also supports:

Internet Protocol (IP)
Transmission Control Protocol (TCP)
User Datagram Protocol (UDP)
Global System for Mobile Communications (GSM) and Code Division Multiple Access (CDMA)
Cellular Digital Packet Data (CDPD)
General Packet Radio Service (GPRS), and 1XRTT The PAL can be easily extended to support other formats because of its modular design.

Link Setup Sublayer

The link setup sublayer performs the following functions:
Discovers the presence and maintains awareness of other nodes
Establishes links to nodes within range
Establishes a Diffie-Hellman key for each link
Establishes an encoding method for each link
Computes and verifies work tokens to resist denial-of-service attacks
Monitors round-trip times for each link
Determines when links are inactive and closes them The link setup sublayer uses an iterative, two-phase process for nodes to exchange information to accomplish the preceding functions.

Link Setup Packet

Figure 5:
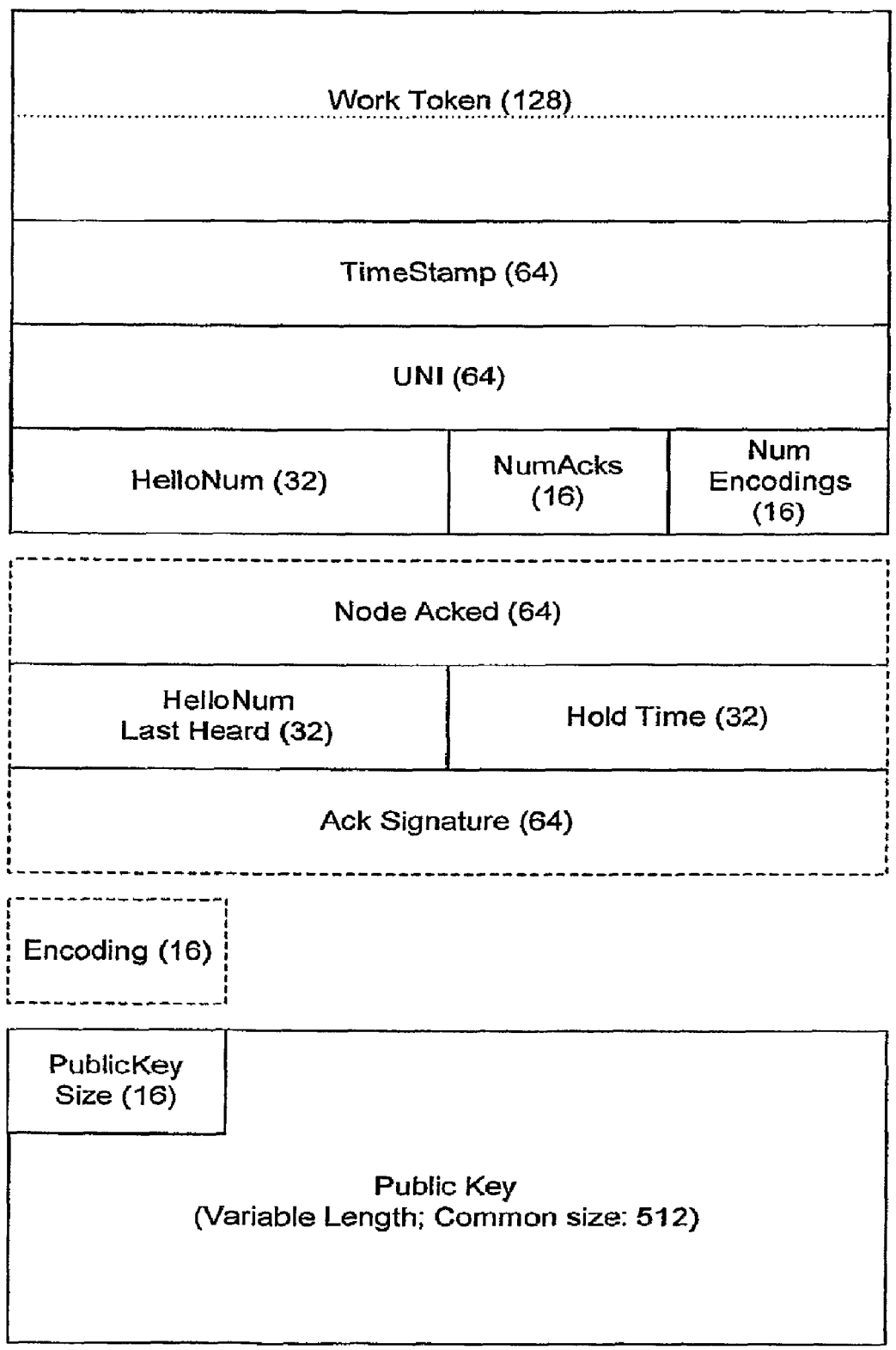
FIG. 5 is a block diagram illustrating a packet format that is employed by a link setup sublayer in some embodiments.

The link setup sublayer uses a single packet format, as is illustrated in FIG. 5, that is referred to as a link setup packet.

The link setup packet provides a mechanism for a node to announce its presence and identity to other nodes, and to simultaneously inform other nodes that it has heard such announcements from them. Therefore, in some contexts the link setup packet acts as a hello packet, and in other contexts it acts as an acknowledgement, or ack packet.

To facilitate the dynamic addition and deletion of nodes on the network, each node broadcasts a link setup packet at fixed time intervals. This also makes it possible for the link setup packet to serve as both a hello and an ack in the same packet. This fixed time interval is called the hello interval and is typically one second. Acknowledgements are piggybacked onto outgoing hello packets. Each node maintains a set of nodes called the ack-set from which it has received a hello within a fixed time interval called the ack-interval, approximately 5-10 seconds.

The ack-interval is a link timeout parameter; if a node A does not receive any hello packets from node B for ack-interval or longer, it drops B from its ack-set and no longer acknowledges B in its outgoing hello messages.

To prevent security attacks from packet floods, each node computes a work token that is included in every link setup packet. A work token is valid for an amount of time called the work token validity interval (WTVI), which is typically a length of time greater than the hello interval but less than the ack-interval. When a work token expires (based on the WTVI), a new work token should be computed by the node before sending out its next link setup packet.

A fourth time interval used by the link layer is the Diffie-Hellman cache interval (DHCI), which should be greater than the WTVI and should also be longer than the ack-interval. The DHCI is the length of time that a node A keeps a cached version of the Diffie-Hellman key it uses to communicate with node B. Because computing the Diffie-Hellman key is resource intensive, it is useful to keep a cached version of the key even after the link has been dropped, in case node B tries to re-establish its link to node A. If node A does not receive a link setup packet from node B within the DHCI, node A purges its cached copy of the key.

The link setup packet—separated by section—is shown in FIG. 5, where dashed lines indicate sections of the packet that can be repeated, and numbers in parentheses indicated the bit-size of each field.

Figure 6:
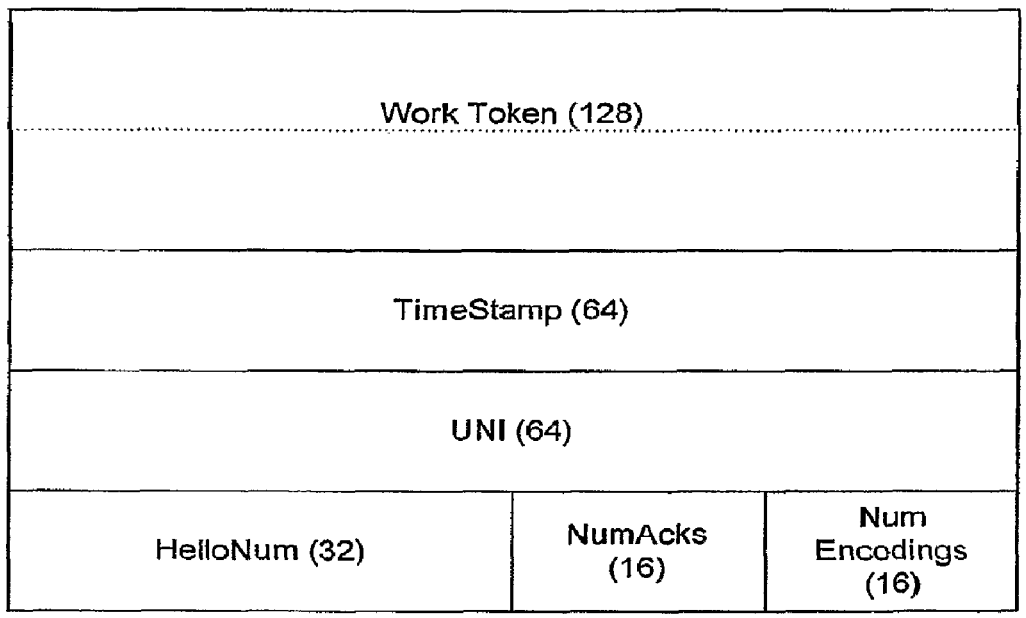
FIG. 6 is a block diagram illustrating a link setup packet in some embodiments.

The link setup packet contains the following sections:
Link establishment fields
A set of acknowledgments and associated fields (the ack-set)
A list of supported encodings
The public key of the node Link Establishment Section of the Link Setup Packet The initial fixed-length portion of the link setup packet, illustrated in FIG. 6, is comprised of the following fields:

Work Token (128) The random number that is used for work token validation, as described in the "Work Token" section. This helps prevent denial-of-service attacks. A work token is valid only for a length of time determined by the work token validity interval, after which a new work token should be computed.

TimeStamp (64) The time (using us time data format) at which the work token was computed. This field is updated every work token validity interval, rather than at every hello interval.

UNI (64) The universal node identifier (UNI) that uniquely identifies this CoCo node. It is an unranked UNI; see [BLMS] for more information.

HelloNum (32) A sequence number that increments with every link setup packet sent by this CoCo node. Link setup packets are broadcast at regular intervals called the hello interval.

NumAcks (16) The number of acknowledgements that are piggybacked onto this packet.

NumEncodings (16) The number of encodings that the sending CoCo node supports.

Acknowledgement Section of the Link Setup Packet

Figure 7:
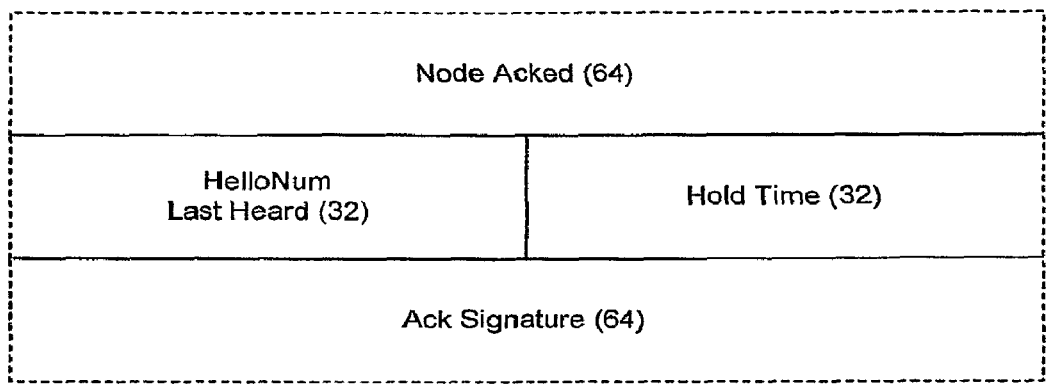
FIG. 7 is a block diagram illustrating an acknowledgement section of the Link Setup Packet in some embodiments.

FIG. 7 is a block diagram illustrating an acknowledgement section of the Link Setup Packet in some embodiments.

This set of fields contains the acknowledgement of the receipt of link setup packets from another CoCo node. These acknowledgements are piggybacked onto the link establishment section of the link setup packet. There can be several acknowledgements in a single link setup packet, each acknowledging the receipt of a link setup packet from a different CoCo node. The number of acknowledgements in a link setup packet is given by the NumAcks field of the link establishment section (see FIG. 6). Each acknowledgement is comprised of the following set of fields:

Node Acked (64) The universal node identifier (UNI) of the node being acknowledged.

HelloNum Last Heard (32) The HelloNum of the last packet received from node being acknowledged.

Figure 10:
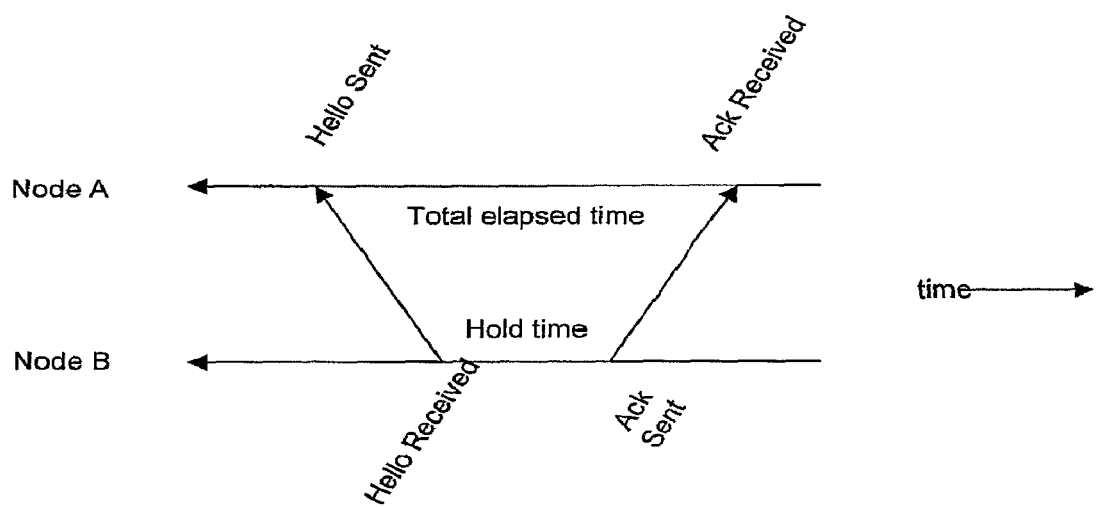
FIG. 10 is a flow diagram illustrating how to determine roundtrip times and reception quality in some embodiments.

Hold Time (32) The time elapsed since the arrival of the last packet from the node being acknowledged; see FIG. 10.

Ack Signature (64) A hash of the Diffie-Hellman key negotiated between this CoCo node and the CoCo node of the packet being acknowledged, used to prevent spoofing of acks. The hash function that is used is negotiated by that pair of nodes as explained in the "Encoding and Security" section below.

Encoding Section of the Link Setup Packet

Figure 8:
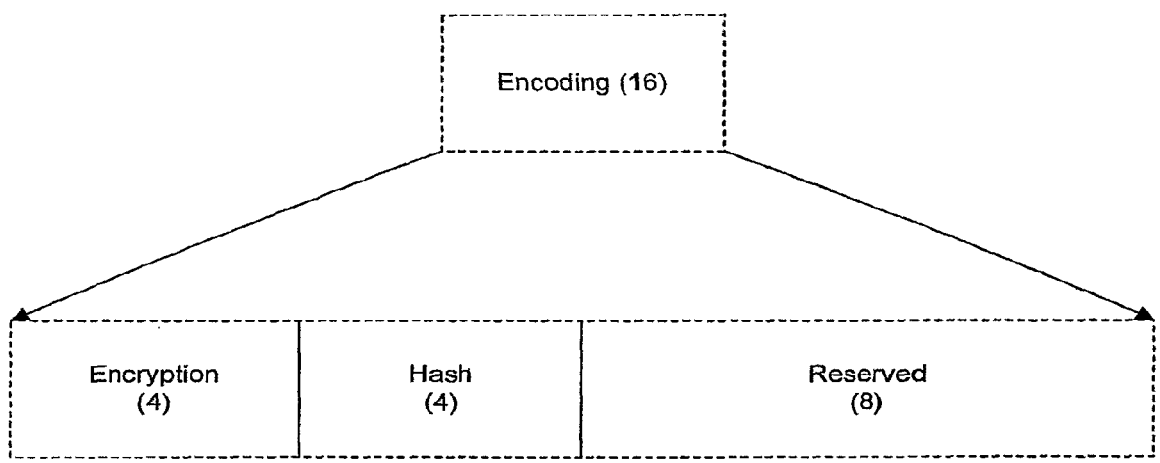
FIG. 8 is a block diagram illustrating an encoding section of a link setup packet in some embodiments.

FIG. 8 is a block diagram illustrating an encoding section of a link setup packet. This section comprises a sequence of Encoding fields, one for each pair of encryption/hash encoding methods that the source node supports. The number of Encoding fields in a link setup packet is given by the NumEncodings field of the link establishment section (see FIG. 6). Each Encoding field is comprised of the following subfields:

Encryption (4) A 4-bit identifier for the encryption method to be used with its associated Hash as an encoding pair. Encryption methods currently supported are RC4, DES, 3DES, Blowfish, and AES.

Hash (4) A 4-bit identifier for the hashing method to be used with its associated Encryption as an encoding pair. The hashing methods currently supported are MD5, SHA1, and RIPEMD Reserved (8) Reserved for future use.

Public Key Section of the Link Setup Packet

Figure 9:
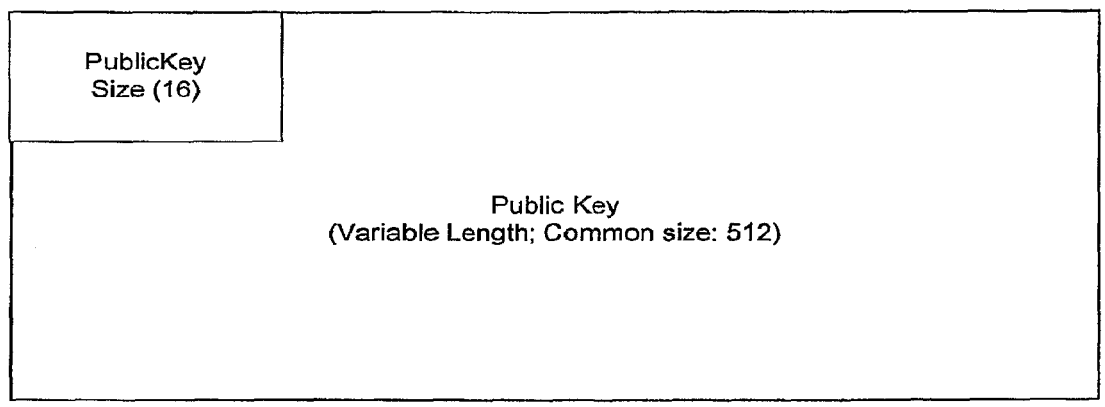
FIG. 9 is a block diagram illustrating a public key section of a link setup packet in some embodiments.

FIG. 9 is a block diagram illustrating a public key section of a link setup packet.

PublicKey Size (16) The size, in bytes, of the Public Key field.

Public Key (variable; commonly 512) The public key used for the Diffie-Hellman key exchange; see the "Encoding and Security" section.

Determining Roundtrip Times and Reception Quality

FIG. 10 is a flow diagram illustrating how to determine roundtrip times and reception quality.

The link setup sublayer enables each node to determine:
Roundtrip times to every other node.
The quality of the signals from other nodes.
The quality of its own signal, as perceived by other nodes.

For a node A to compute the roundtrip time to a node B, node A notes the time elapsed between the time it sends a setup packet to node B and the time it receives a link setup packet from node B acknowledging setup (checking that the value of hello-num is the same), and then subtracts the hold time that appears in that acknowledgement.

In addition to roundtrip time computation, the link setup layer can determine signal quality based on the percentage of link setup packets that it sends which are later acknowledged. For example, if node B receives hello packets from node A numbered 1, 2, 3, 4, . . . then it knows that it has a strong signal from node A. On the other hand, if node B receives hello packets from node A numbered 4, 9, 15, 23, . . . then it knows that the signal from node A is relatively weak. Similarly, if node A receives acknowledgements from node B and A's hello packets contain gaps in the numbered sequence, (for example, 5, 11, 17, 21, . . . ) then node A knows that the signal from node B is weak, its signal to node B is weak, or both.

Encoding and Security

The encoding and security of the link layer relies upon a Diffie-Hellman key exchange between nodes, as well as the exchange of work tokens to prevent denial-of-service attacks.

Work Tokens

A rogue node could mount denial-of-service attacks against a network by:
Flooding nodes within its range with link setup requests.
Simulating the existence of a multitude of fake nodes.

These actions constitute an attack since nodes that receive link setup requests should perform a Diffie-Hellman key-exchange computation, which is resource intensive (approximately one millisecond on a 400 MHz XScale processor). In the presence of a large number of malicious establishment requests, link establishment requests from legitimate nodes may be delayed or denied altogether due to timeouts.

Therefore, the link setup protocol uses a mechanism called a work token to force nodes attempting to establish a link to perform a nontrivial computation. This makes such denial-of-service attacks more costly for the attacker, lessening their likelihood or preventing them altogether, depending on the attacker's computational resources.

Because of these considerations, validating a work token precedes the Diffie-Hellman computation. If the work token is invalid, the node may not devote time computing a Diffie-Hellman key, which is a much more expensive computation than the work token verification.

Before node A can send a link setup packet to node B, node A should compute a valid work token, W, which it places in the work token field of its link setup packet (see FIG. 6).

This timestamp T is also included in the link setup packet (see FIG. 6). Upon receipt of the link setup packet, node B uses the timestamp to determine whether the work token has expired (and is therefore invalid).

Work Token Algorithms

In the following work token algorithms, the function h is a global hash function set within the protocol source code that is used by all CoCo nodes. The outputs of h are distributed uniformly across its range [0, MAX].

The value r in Step 3.b of the following algorithms is chosen to be small relative to MAX. This value r is set at the time of network provisioning and can be chosen for a particular deployment as a way of calibrating the tradeoff between security and efficiency of this protocol. This is because Step 3.b succeeds probabilistically with MAX/r expected iterations, since the outputs of h are uniformly distributed over its range.

The notation (Z, Y) used in the following algorithms indicates string concatenation of the binary representations of Z and Y.

Work Token Computation

Node A should ensure that all link setup packets it sends out contain a valid work token. If the time difference between the current time and the timestamp, T, of its most recently-sent packet is less than the work token validity interval, node A resends its most recent packet. Otherwise, the previously-sent work token is now invalid and should be recomputed by performing the following steps:
1. Node A identifies itself by setting the UNI field of its link setup packet (see FIG. 6) to its name, N.
2. Node A sets the TimeStamp field of its link setup packet to the current time, T.
3. Node A then
   a. Chooses a 128-bit random number, X.
   b. Tests to see if $c=h(X,T,N,X)<r$. (The comma represents the concatenation operation.)
   c. Repeats Steps 3.a and 3.b until it finds an X such that the resulting c is indeed less than r.

4. Node A sets the Work Token field of its link setup packet to the work token, W, which is the successful value of X that was used to complete Step 3.c.

With a new valid work token now computed, node A sends out the link setup packet, containing the values of W, T, and N in the appropriate fields of the link establishment section of the packet.

1.1.1.1.1 Work Token Validation

When node B receives a link setup packet from node A, it should verify that the work token is valid before continuing with its link establishment to node A. Because verifying the work token is much faster than computing the Diffie-Hellman key, overhead is reduced because not all link setup packets will contain a valid work token and resources will not be wasted on computing a Diffie-Hellman key for those packets. In addition, by silently ignoring all link setup packets that contain invalid work tokens, the protocol reduces the number of packets it uses, and hence the overall traffic overhead induced by the protocol is also reduced. Silently ignoring the failures also reduces exposure to attacks, since the less activity the protocol generates, the fewer the opportunities there are to exploit it.

Each node B maintains a cache of previously-calculated Diffie-Hellman keys for each node A from which it has received valid link setup requests. This ensures that node B may not need to recalculate the Diffie-Hellman key in the case where its acknowledgment to node A gets lost. The cached key can also be use to quickly re-establish recently dropped links. Node B eventually purges its cached key for node A if it receives no link setup packets from node A for a duration of time that exceeds the Diffie-Hellman cache interval.

To verify that the work token in the link setup packet from node A is valid, node B performs the following:
1. Node B extracts W, T, and N from the Work Token, Time Stamp, and UNI fields, respectively, of the link setup packet it received from node A; see FIG. 6.
2. Node B checks whether the work token has expired, based on the timestamp, T, in the link setup packet, the current time, and the work token validity interval.
    a. If the work token has expired, node B ignores the link setup request because node A might be attempting a packet flood attack or a reply attack by using previously-valid values of W and T
    b. If the work token has not expired, node B continues with the verification process.
3. Node B checks whether it has a cached Diffie-Hellman key from node A.
    a. If a cached key for node A exists, node B acknowledges node A in the next link setup packet it sends out, setting the Ack Signature field (see FIG. 7) to the hashed key in its cache.
    b. If a cached key for node A does not exist, node B continues with the verification process.
4. Node B computes v=h(W,T,N,W). (The comma represents the concatenation operation.) The value of v should be the same as the successful value of c that was computed in Step 3.b of the work token computation (described previously), and therefore v should be less than r.
    a. If $v \geq r$, node B ignores the link setup request because node A has not sent a valid work token and therefore might be a rogue node.
    b. If v<r, node A has sent a valid work token so node B continues with the link setup process.

With a valid work token verified, node B is ready to continue with the link setup process by acknowledging the link setup packet it received from node A.

Acknowledging a Link Setup Request

After verifying that node A sent a valid work token, node B continues with the link setup. If node B does not already have a cached value of the Diffie-Hellman key for its link with node A (see Step 3 of the work token validation algorithm), it performs the following steps:
1. Node B computes the Diffie-Hellman key for its link with node A. See the section "Diffie-Hellman Key Exchange" for more information.
2. Node B caches the Diffie-Hellman key with the UNI that identifies node A. Because node A regularly broadcasts its link setup hello packet and node B acknowledges each hello it receives from node A, it can be useful to keep a cached version of the Diffie-Hellman key.
3. Node B establishes an encryption and hashing function pair for the link. See the section "Establishing Link Encryption and Hashing" for more information.
4. Node B acknowledges node A in the next link setup packet it broadcasts, setting the Ack Signature field (see FIG. 7) to the hashed Diffie-Hellman key it computed. This enables node A to quickly authenticate the acknowledgement, preventing a rogue node from spoofing acks, which would keep unused links open and degrade performance because of all the extra acks that node A would need to include in its link setup packets.

Diffie-Hellman Key Exchange

Because the Diffie-Hellman key exchange is a component to the security and encoding of the link layer, this section provides a brief overview of the process.

Nodes A and B agree on a prime number, p, and a generator, g, modulo p. (The values p and g are supplied to each device at provision time and can be publicly known.) Node A chooses a private key a; node B chooses a private key β (α and β are each between 1 and p−1). CoCo nodes may be supplied with private keys at provision time, or they may choose a private key at startup time by any of several standard methods (see the section "Generating Keys" in [S]). The key exchanged between the two nodes is computed as follows:
1. Node A sends node B its public key—the value $P_A=g^\alpha$ (sent in the link setup hello packet from A to B in the public key field; see FIG. 9).
2. Node B sends node A its public key—the value $P_B=g^\beta$ (sent in the link setup ack packet from B to A in the public key field; see FIG. 9).
3. Node A computes $(P_B)^\alpha=(g^\beta)^\alpha$
4. Node B computes $(P_A)^\beta=(g^\alpha)^\beta$
5. These two values from Steps 3 and 4 are the same, so it can be referred to as $k_{DH(AB)}$, or simply k if the context is understood. This value is known to both A and B, and to no one else, since determining α from $g^\alpha$ is computationally infeasible (see [S]). Therefore A and B can use it as a secret key for the encryption method they will use for all data sent over the link between them (see "Establishing Link Encryption and Hashing").

Continuity of Identity after a Diffie-Hellman Key Exchange

After an exchange of link setup packets and the Diffie-Hellman key between nodes A and B, each node knows that the other should have had a valid private key. The key $k_{DH(AB)}$ is then used throughout the session in which this link is used, so there can be no man-in-the-middle attacks once a session begins. Any man-in-the-middle attack should have happened prior to link establishment and should last for the lifetime of the link. The Diffie-Hellman key exchange guarantees continuity of identity; that is, once a node begins communicating over a link, it is guaranteed to be talking to the same node for the duration of the link session.

Establishing Link Encryption and Hashing

Each node maintains an ordered list of encodings it supports. Each encoding in the list represents an encryption method paired with a hashing function. When a node sends a link setup packet, it includes the encodings that appear in this list in the encoding section of the packet (refer to FIG. 5 and FIG. 8). The encodings appear in the link setup packet in the same order they appear in its ordered list.

After node A sends a link setup (hello) packet to node B and node B sends a link setup ack packet to node A, nodes A and B each have a list of the paired encryption methods and hash functions supported by the other, ordered by preference. Nodes A and B each perform the following steps to determine which of these encoding methods to use over the newly established A-B link.

1. Determine whether node A or node B is the preferential encoder (see the following section).
2. Pick the encoding method highest on the preferential encoder's list that also appears on the list of the other node. If no match is found, communication occurs over this link unencrypted. (If security requirements demand that no data be transmitted over an unencrypted link, the circuit used for the data transmission will never incorporate an unencrypted link; see [BMV] for more information.)

This link encoding selection algorithm is efficient because it requires the receipt of only a single packet by each participant.

Algorithm to Determine the Preferential Encoder

This algorithm is a deterministic process by which both nodes A and B conclude by agreeing on the outcome. Nodes A and B perform this algorithm by comparing $(P_A - P_B)$ modulo p and $(P_B - P_A)$ modulo p. If the former is larger, node A is the preferential encoder; if the latter is larger, node B is the preferential encoder. Here, $P_A$ and $P_B$ are the Diffie-Hellman public keys of nodes A and B, respectively, and p is the prime modulo that is used to perform the Diffie-Hellman computation. Note that this algorithm is deterministic, so both nodes A and B compute the same preferential encoder.

Link State

Figure 11:
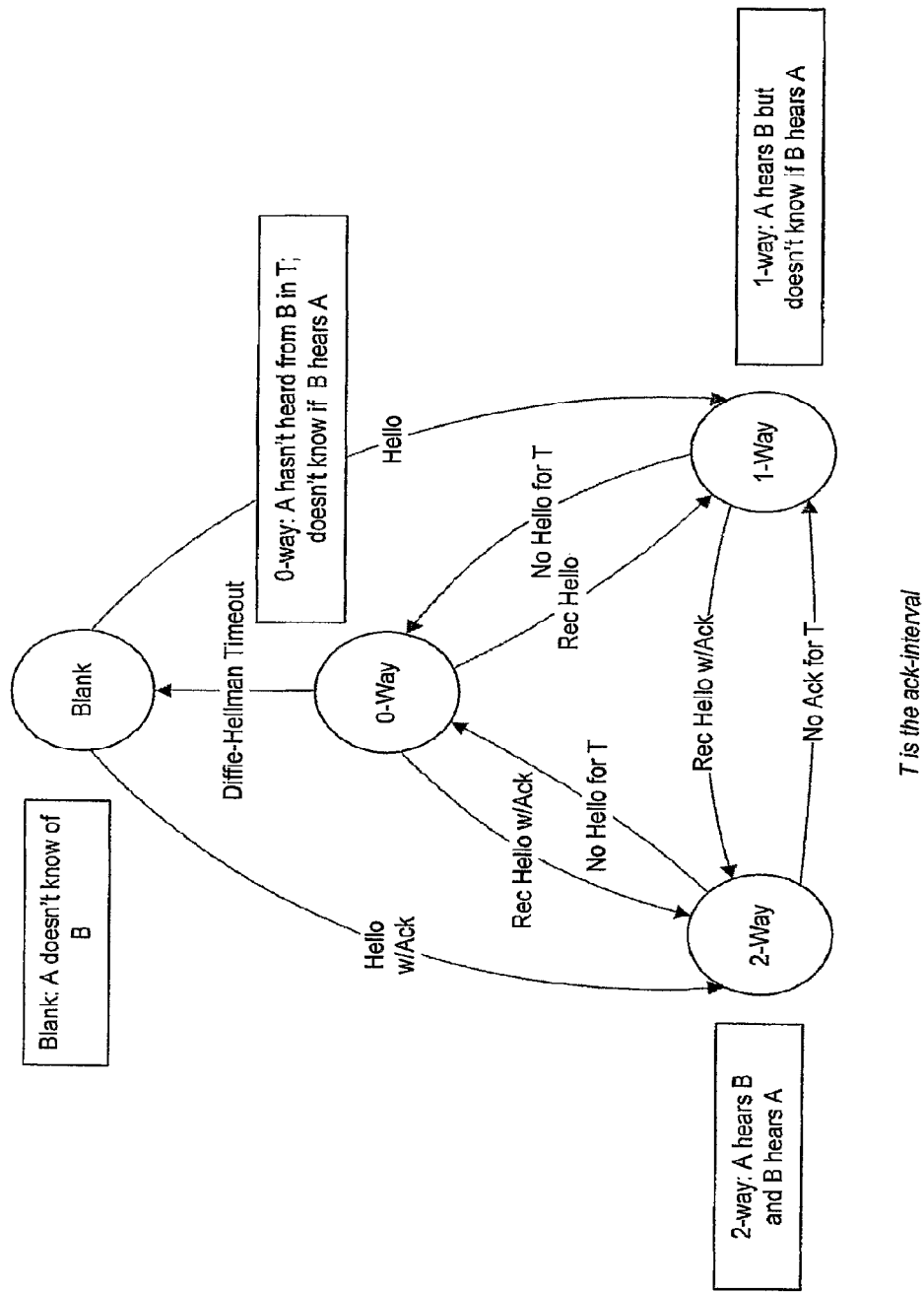
FIG. 11 is a state diagram showing link states in various embodiments.

FIG. 11 is a state diagram showing possible link states.

Every node keeps a link state table, which includes an entry for each node it has heard from that contains:
  The Diffie-Hellman key used to communicate with that node; see the "Encoding and Security" section.
  The last hello-num it received from that node.
  The hello-num in the last acknowledgement it has heard from that node.

Every node also maintains a state machine for each node it has heard from. The state machine on node A manages the state of its link with node B and is called the A-B link state machine. The A-B link state machine for node A can exist in one of four states (see FIG. 11):
  Blank: node A is not aware of node B.
  0-way: node A is aware of node B but has not received a link setup hello from node B. (A knows of B but hasn't heard from B.)
  1-way: node A has received a link setup hello from node B but has not received an acknowledgment from node B. (A hears B but doesn't know whether B hears A.)
  2-way: node A has received a link setup hellop from node B and has also received an acknowledgement from node B. (A hears B and knows that B also hears A.)

Node A will send link data packets to node B only when the A-B link state machine is in state 2-way.

Let M be the A-B link state machine for node A. The state machine M can change in one of the following six ways:
1. M is in state blank or 0-way and node A receives a link setup hello packet from node B, then
    M transitions to one of the following states:
      State 1-way if the link setup packet from node B does not contain an ack for node A.
      State 2-way if the link setup packet from node B also contains an ack for node A. (This would happen, for example, if node A initiated the link setup with node B).
    Node A:
      Validates the work token.
      Establishes an encryption and hashing function pair for the link.
      Computes and caches a Diffie-Hellman key (if the key is not already cached).
      Adds node B to its ack-list.
2. If M is in state 1-way and node A receives a link setup acknowledgement about itself from node B, then
    M transitions to state 2-way.
3. If M is in state 2-way and node A does not receive an acknowledgement about itself from node B for longer than the ack-interval, then
    M transitions to state 1-way.
4. If M is in state 1-way or 2-way and node A does not receive a link setup hello from node B for longer than ack-interval, then
    M transitions to state 0-way.
    Node A removes node B from its ack-list.
5. If M is in state 0-way and node A's Diffie-Hellman cache interval expires, then
    M transitions to state blank.
    Node A removes the Diffie-Hellman key for node B from its cache.
6. In all states, node A sends at every hello-interval a link setup packet containing an (incremented) hello-num, a time stamp and work token, and acknowledgements for each node it has heard from in the last ack-interval (which have entries in its link state table).

Link Data Sublayer

The link data sublayer is responsible for getting data from one node to another across an established link, managing data flow, monitoring QoS measurements such as latency and roundtrip times, and performing compression and fragmentation.

Higher Layer Packet Types

Any packet that is not a link setup packet is treated by the link layer as data destined for higher protocol layers; in the CoCo Protocol these include the routing layer, circuit layer, and naming system layer.
  Clustering packets contain information related to clusters, a recursive decomposition of CoCo nodes that permits more efficient routing (see [BLMS]).
  Advertising packets contain information about the cost of reaching nodes (see [BLMS]).
  Circuit control packets contain information about the establishment and maintenance of circuits, which are dedicated end-to-end communication paths (see [BMV]).

The Link Data Packet

Unlike link setup packets, link data packets contain user data. The length of the data is not specified in the packet header because the entire packet length is given in the CoCo header that was constructed by the Protocol Abstraction Layer (see FIG. 4). The CoCo header for each data packet is stored in the node's memory so it can be easily accessed by the higher protocol levels that will use the packet data.

Before a data packet can be sent between them, a link should be established between nodes A and B. Therefore, nodes A and B will have exchanged link setup packets and will have calculated a Diffie-Hellman key $k_{DH(AB)}$ that is specific to their link (see the "Diffie-Hellman Key Exchange" section). Nodes A and B will have also negotiated a hashing function $h_{AB}$ and an encryption method $e_{AB}$ that are specific to the A-B link (see the "Establishing Link Encryption and Hashing" section).

The entire data packet content is encrypted with the function $e_{AB}$. Note that "none" is one of the encryption methods, so if both nodes A and B agreed upon "none" as the encryption method, each of A and B knows not to attempt to encrypt when sending nor decrypt when receiving.

Figure 12:
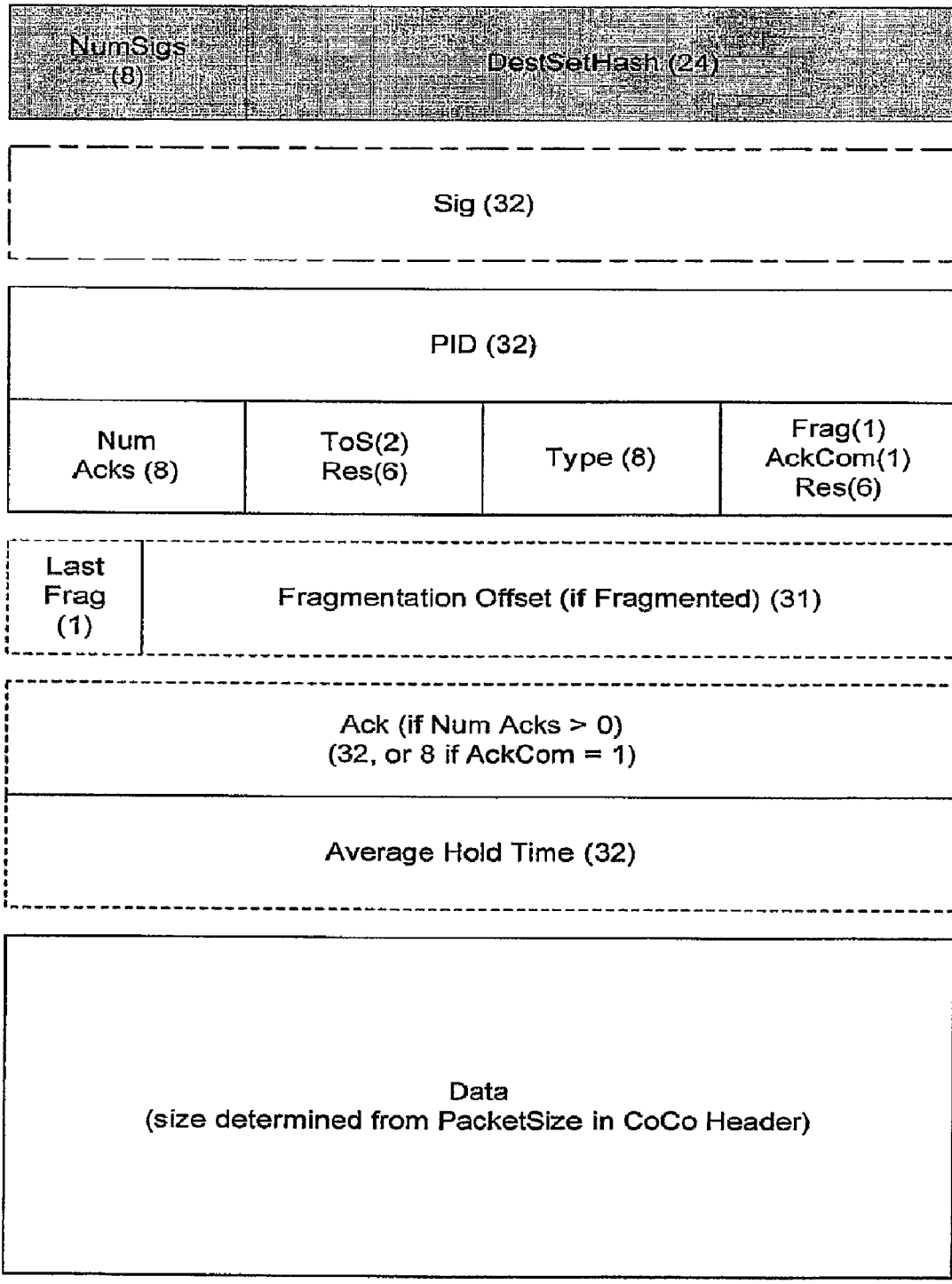
FIG. 12 is a block diagram illustrating a link data packet in some embodiments.

The link data packet—separated by section—is shown in FIG. 12, where dashed lines indicate sections of the packet that can be repeated, and numbers in parentheses indicated the field size in bits.

Figure 13:
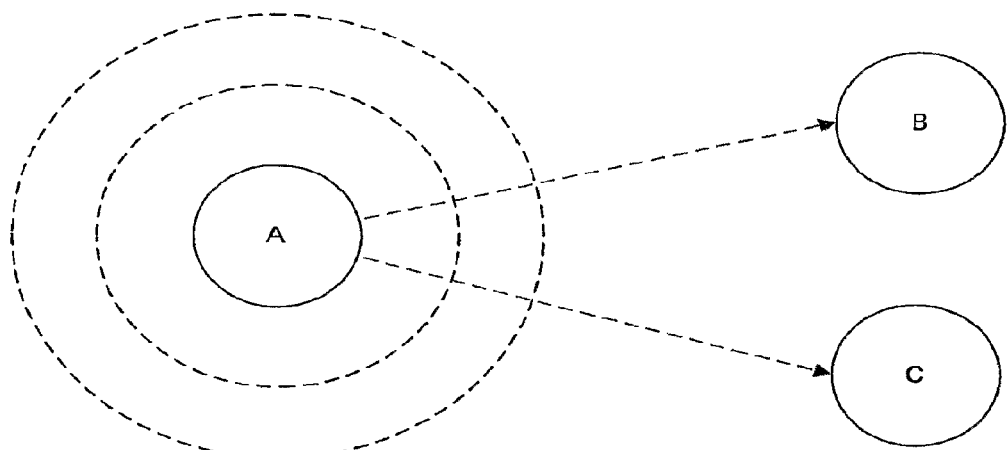
FIG. 13 is a block diagram illustrating multicasting in some embodiments.

The link data packet contains the following sections:
Fields used when the data packet is multicast
A signature that serves as a secure checksum of the data packet
Information specific to each data packet
Fragmentation information so the data can be reconstructed if the packet needs to be fragmented
A set of acknowledgments of received data packets
The average hold time of the packets being acknowledged
The actual data that will be either processed by the higher protocol layers or sent to the network interface layer
Multicast Section of the Link Data Packet FIG. 13 is a block diagram illustrating multicasting. The link layer protocol supports multicasting. Multicast support enables non-redundant transmission of data sent from a single source to multiple destinations, meaning only one copy of the data packet is sent across a broadcast interface if the links from the source to the destinations share the interface. For example, suppose node A has links to nodes B and C using the same wireless interface, as shown in FIG. 13. To send the same packet to both nodes B and C, node A broadcasts the packet on the interface only once.

Figure 14:
FIG. 14 is a block diagram, illustrating a destination set section of a link data packet in some embodiments.

For multicast messages with many recipients sharing the same broadcast link, multicast support represents a substantial reduction of bandwidth utilization. However, since the recipients of a multicast use different Diffie-Hellman keys for encrypting data over their links to the source node, multicast data packets are not encrypted. FIG. 14 shows the multicast section of a link data packet; this section is not present in unicast data packets.

Using a Destination Set to Improve Multicast Efficiency

FIG. 14 is a block diagram illustrating a destination set section of a link data packet. Before sending a multicast packet, a node should identify which nodes are the intended recipients of the broadcast data. For each intended recipient, it computes and attaches a signature to the outgoing packet (see "Signature Section of the Link Data Packet"). In addition, the broadcasting node creates a 24-bit hash value from the concatenation of the intended recipients' UNIs. This hash value is put into the DestSetHash field of the link data packet (see FIG. 14). The DestSetHash value provides a quick way for nodes that receive a broadcast packet to determine whether they are any of the intended recipients.

When a node receives a broadcast packet it compares the DestSetHash field of the received packet against a table of previously-received DestSetHash values. The table cross-references the DestSetHash with the position of that node's signature in the array of signatures that are sent with the packet. If the node is not an intended recipient, the signature position will be 0 for that DestSetHash value, and the node can discard the packet.

If the DestSetHash field of the received packet is not in the table, the node calculates its signature for the packet (see "Signature Section of the Link Data Packet") and compares its signature with each of the signatures attached to the packet (which indicate the intended recipients). If the node finds a match, it adds the DestSetHash value and the signature position to its table of known DestSetHash values. If no signature match is found, the DestSetHash value is added to the table with a signature position of 0, indicating that the node is not one of the intended recipients for broadcast packets that contain this DestSetHash; the node then discards the packet.

Because signatures also act as checksums for packet integrity, a packet with incomplete data will have a different signature than that same packet when it is complete. If such an incomplete packet arrived at an intended recipient with a new DestSetHash value, the intended recipient would not find any matching signatures and would therefore incorrectly conclude that this DestSetHash value indicates that this node (which received the packet) is not an intended recipient. This node would then incorrectly ignore all future broadcast packets with this DestSetHash value. This can be avoided by relying on checksums performed at the Medium Access Control (MAC) level, which is part of the network interface level, to ensure packet integrity.

Fields in the Multicast Section of the Link Data Packet

NumSigs (8) The number of signatures that appear in the packet; it is in the range from 1 to 255. A separate signature is created for each intended recipient of the multicast data packet (see "Signature Section of the Link Data Packet"). This field appears only in multicast data packets; it is absent in unicast data packets.

DestSetHash (24) Contains a unique value created from a hash of the set of intended destination nodes. This field appears only in multicast data packets; it is absent in unicast data packets.

Signature Section of the Link Data Packet

The signature section of the link data packet serves as a secure checksum for the packet data and also authenticates the data sender. The sender of a data packet, node A, computes a hash of the data and Diffie-Hellman key used for the recipient—h(k, D, k)—and places it in the Sig field of the link data packet header. When node B receives the packet, it applies the hash function h to the string k,D,k and verifies that the result matches the contents of the Sig field. If the two match, node B knows that the data arrived uncorrupted with high probability (because h(k,D,k) is a checksum), and it also knows that the data should have come from node A (because only A knows the value of k).

Folding the Hash Value

Figure 15:
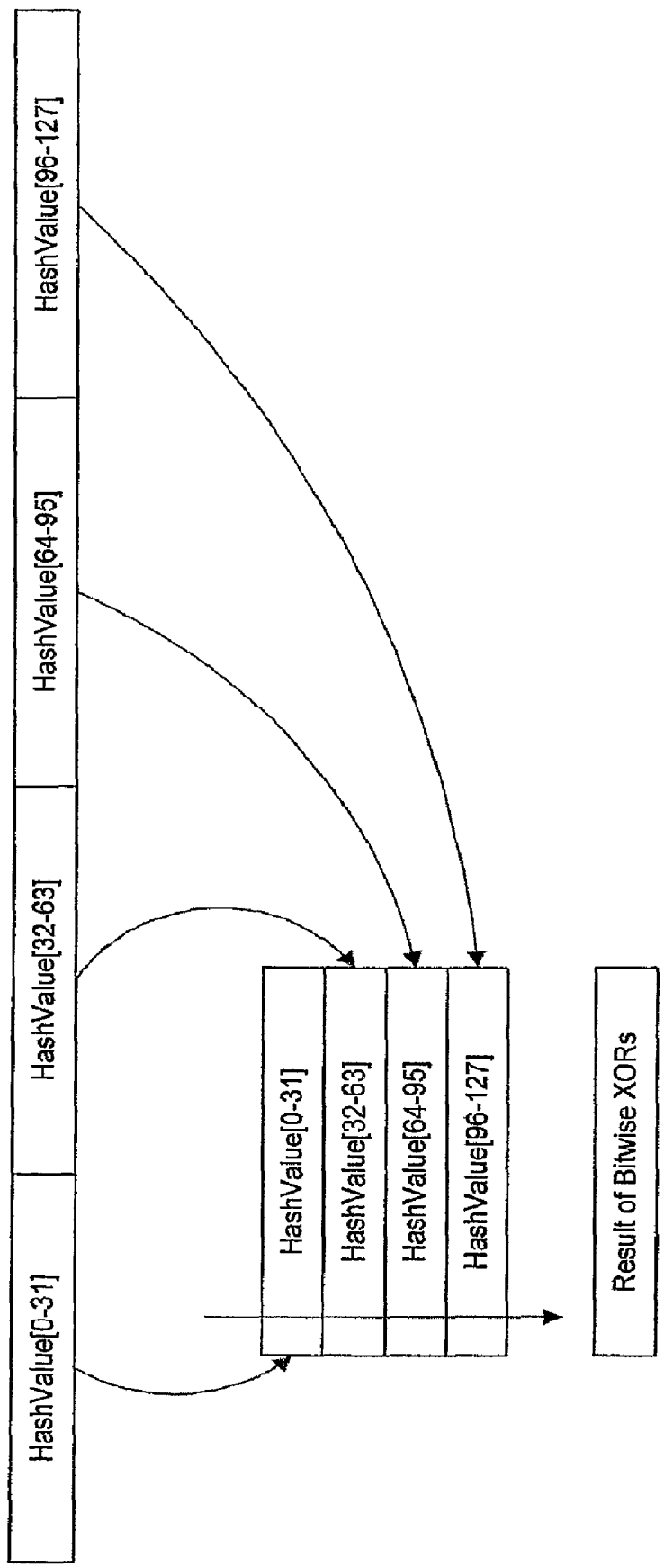
FIG. 15 is a flow diagram illustrating a technique for folding hash values used in some embodiments.

FIG. 15 is a flow diagram illustrating a technique for folding hash values. The output of the standard hash functions—for example, MD-5—is a 128 bit hash value. This is collapsed into a 32-bit quantity by a process called folding. To fold a 128 bit hash value $h_{128}$ into a 32-bit result $h_{32}$, the exclusive-or operator is applied bit-wise to the four 32-bit substrings of $h_{128}$. More precisely:

$$h_{32}[i] = h_{128}[i] \theta h_{128}[i+32] \theta h_{128}[i+64] \theta h_{128}[i+96] \text{ for each } i=0\ldots31$$

where $\theta$ represents the exclusive-or operator.

Figure 16:
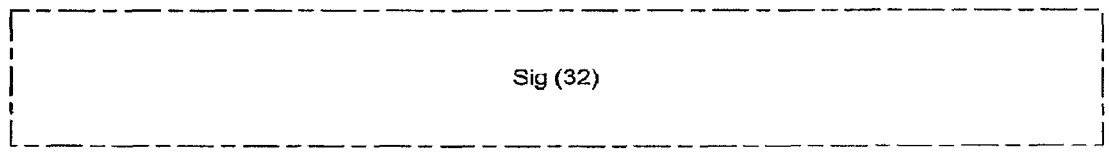
FIG. 16 is a block diagram illustrating a signature field section of a data link packet in some embodiments.

To see this more graphically, suppose $h_{128}$ is the string shown at the top of FIG. 15. By realigning the four 32-bit substrings shown as a stack of four 32-bit strings in FIG. 15, one can obtain a single 32-bit hash value as the result of the bit-wise exclusive-or of the four bits that appear in each column. Although $2^{96}$ different hash values in $h_{128}$ fold into a single hash value in $h_{32}$, the $2^{32}$ different values of $h_{32}$ make it difficult to spoof a node by simply guessing the hash value. Fields in the Signature Section of the Link Data Packet FIG. 16 is a block diagram illustrating a signature field section of a data link packet. Sig (32) Serves as a secure checksum for the data and authenticates the data sender. Node A sets this field to the 32-bit folded string of h(k, D, k), where h is the negotiated hash function, k is the Diffie-Hellman key for the link and D represents the data in the packet, which follows the packet header. In this context, the comma represents the concatenation operator. A unicast data packet has only one Sig field, whereas a multicast data packet can have multiple Sig fields, with the actual number of signatures given by the NumSigs field in the multicast section of the packet (see FIG. 14).

Packet Information Section of the Link Data Packet

Once nodes A and B establish a link with each other, packets sent from A to B are numbered sequentially (0, 1, 2 . . . ) with a Packet ID (PID). Likewise, packets sent from B to A are also numbered sequentially, using a separate sequence for its own PIDs. To safeguard against reply attacks, the link layer discards packets that arrive with a PID less than HighestPID or greater than HighestPID+RangePID, where HighestPID is the highest value of a PID so far received in any link data packet, and a typical constant value for RangePID is 1000. In any implementation, appropriate adjustments should be made to handle "wraparound," that is, accommodating the smooth transition from the PID with bit pattern of all ones to the PID with bit pattern of all zeros. This is necessary to because the PID is a 32-bit unsigned integer field, so arithmetic is performed modulo $2^{32}$.

Fields in the Packet Information Section of the Link Data Packet

Figure 17:
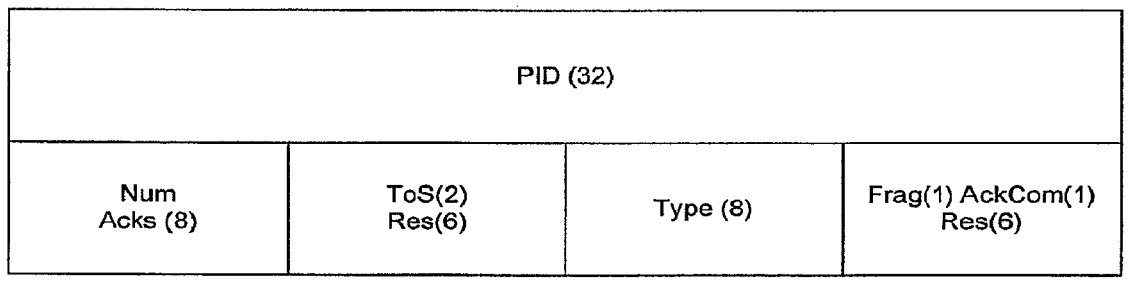
FIG. 17 is a block diagram illustrating a packet information section of a data link packet in some embodiments.

FIG. 17 is a block diagram illustrating a packet information section of a data link packet. PID (32) An integer that increments sequentially with each packet sent over the life of the link (per link, per direction).

NumAcks (8) The number of acknowledgements of incoming packets that are included with this (outgoing) packet. See "Acknowledgement Section of the Link Data Packet" for more information.

ToS (2) Specifies the type of service for the data passed over the link. The currently supported ToS types are given in Table 1.

TABLE 1

Currently supported ToS types

| ToS filed (decimal) | Description |
|---|---|
| 0 | Video-audio broadcast (passive media streaming) |
| 1 | Media-stream interactive (active voice conversation) |
| 2 | Passive data file transfer (ftp) |
| 3 | Interactive data file transfer (web browsing) |

If more types are identified and considered desirable, some of the 6 bits in the reserved field adjacent to the ToS field in the link data packet header may be used.

Type (8) Describes the type of data contained in the packet, as shown in Table 2. This field is set to 0 if the packet contains only acknowledgements. Otherwise, this field is available for the purposes of higher protocol layers.

TABLE 2

Possible values for the Type field

| Type field (decimal) | Purpose |
|---|---|
| 0 | Acknowledgement-only packet |
| 1 | Advertisement packet (routing layer) |
| 2 | Test packet (routing layer) |
| 128 | Circuit data (CDAT) packet (circuit layer) |
| 129 | Circuit establishment (CEST) packet (circuit layer) |
| 130 | Circuit close (CCLS) packet (circuit layer) |
| 131 | Circuit acknowledgement (CACK) packet (circuit layer) |
| 132 | Circuit reset (CRST) packet (circuit layer) |
| 133 | Circuit unknown (CUNK) packet (circuit layer) |

Frag (1) Set to 1 when a packet represents one of several fragments from an original data packet; otherwise set to 0. When a packet size exceeds the network interface MTU, the link data layer breaks the data portion of the packet into fragments sufficiently small enough that when combined with the link data header the resulting packet is within the MTU constraint. See "Fragmentation Section of the Link Data Packet" for more information.

AckCom (1) Set to 1 when there is acknowledgement compression, which means that acknowledgements are 8 bits in length instead of 32 bits; otherwise set to 0. See "Acknowledgement Section of the Link Data Packet" for more information.

Res (6) Reserved for future use.

Fragmentation Section of the Link Data Packet

Figure 18:
FIG. 18 is a block diagram, illustrating a fragmentation section of a link data packet in some embodiments.

FIG. 18 is a block diagram illustrating a fragmentation section of a link data packet.

The link layer protocol supports a process called link packet fragmentation. When the link layer receives a packet from the circuit and routing layers, the packet may be too large for the network interface layer to handle. This may be due to hardware-related maximum transmission unit (MTU) restrictions. In this case, the link layer fragments the packet it receives into smaller packets before sending them to the network interface. Similarly, when it receives such fragmented packets, it reformats them to their original packet configuration before relaying them to the routing and circuit layers. The MTU is the largest packet size that the underlying network transport technology can support and varies for different technologies such as Ethernet, satellite, WiFi, and wireless carrier.

All packets that contain fragments from a single higher-level packet—such as a circuit layer packet—contain the same PID. The receiving node sends an acknowledgement for this PID only after receiving all the fragments.

Each data packet fragment contains a offset that describes that fragment's position within the higher-level packet. These offsets, along with a bit that indicates the last fragment, enable the receiver to reassemble the fragments.

The Frag field of the Packet Information section (see FIG. 17) indicates whether the current data packet is a fragment of a larger block of data. The remaining fields related to packet fragmentation are shown in FIG. 18.

Fields in the Fragmentation Section of the Link Data Packet

LastFrag (1) Set to 1 if the packet contains the last of a series of fragments; otherwise set to 0.

Fragmentation Offset (31) Set to the byte offset of this fragment from the beginning of the original data packet.

Acknowledgement Section of the Link Data Packet

The link layer recognizes packets by using a system that attaches acknowledgements of incoming packets to outgoing packets—for as many incoming packets as possible within time and space constraints, up to a fixed limit. When an outgoing packet is ready to be sent, the link layer attaches available acknowledgements. If acknowledgements are available but there are no ready outgoing packets, the link layer should wait for one of two events:

A fixed time limit has elapsed

A fixed number of acknowledgements accumulate

Regardless of which state occurs, the link layer creates a blank packet unrelated to any active data stream, attaches the waiting acknowledgements, and sends the packet.

When acknowledgement compression is used (by setting the AckCom field of the Packet Information section; see FIG. 17), only the 8 lowest-order bits are used from the PID of the packet being acknowledged. As long as the ack is received by the sending node within the 256 most-recent packets it has sent, the node can reliably determine which packet is being acknowledged.

Fields in the Acknowledgement Section of the Link Data Packet

Figure 19:
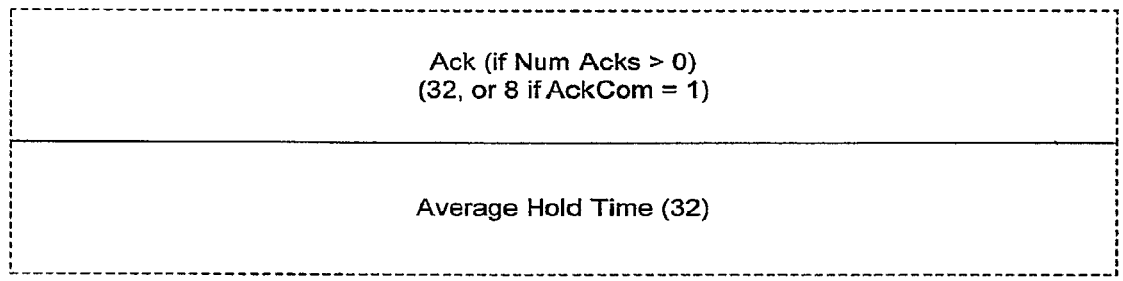
FIG. 19 is a block diagram illustrating fields in an acknowledgement section of a link data packet in some embodiments.

FIG. 19 is a block diagram illustrating fields in an acknowledgement section of a link data packet. Ack (8 or 32) Contains the PID of an incoming packet received and being acknowledged. The size of the field is 8 bits or 32 bits, depending on the value of the AckCom field in the Packet Information section (see FIG. 17). The number of Ack fields present is given by the NumAcks field (also in the Packet Information section).

Average Hold Time (32) Contains the average of the hold times of each of the packets being acknowledged by this packet. This field is used for measuring quality of service.

Distinguishing Multicast from Unicast

The procedure OnReceiveDataPacket( ), outlined in the following psuedocode, describes how the link layer distinguishes a unicast packet from a multicast data packet. This processing is performed in the PAL. When a sender wants to perform a multicast, it computes a value, DestSetHash, determined by the set of the intended recipients (see "Multicast Section of the Link Data Packet" for more information about the DestSetHash value). Although each node that physically receives the packet is able to determine if it is one of the sender's intended recipients by scanning the signatures in the packet header, the DestSetHash value provides a way to more quickly determine whether the local node is an intended recipient by eliminating the need to always scan through the list of signatures in the packet header.

In the procedure OnReceiveDataPacket( ), the variable DestSetTable is an array indexed by values of DestSetHash. Each entry contains an unsigned integer value. The local node is in DestSetHash if DestSetTable [DestSetHash] is nonzero, in which case the value of DestSetTable [DestSetHash] indicates the position of the signature (in the list of signatures attached in the data packet header) that should match the local node's signature. If the value of DestSetTable [DestSetHash] is zero, the local node is not an intended recipient and it should discard the packet.

The value of DestSetTable [DestSetHash] is defined only after the local node receives a packet containing the value DestSetHash in the DestSetHash field of the packet. Prior to that, DestSetTable [DestSetHash] is undefined. If a sender broadcasts packets with a different set of intended destinations, it computes a new value of DestSetHash for the DestSetHash field on the data packet it sends. When the local node receives a multicast packet that contains a new DestSetHash value, it calculates its signature and scans for a match among the signatures in the packet header. The position of the matching signature is placed into DestSetTable [DestSetHash]; if no signatures match, DestSetTable [DestSetHash] is set to zero and the packet is discarded.

```
procedure OnReceiveDataPacket (linkID)
{
    if frame header indicates network frame is not broadcast then
        Process this packet normally, as a unicast packet;
    else // This packet is a broadcast packet.
        // See if the local node is an intended recipient:
        if DestSetTable[DestSetHash] is defined then
            sigOffset ← DestSetTable[DestSetHash];
            if sigOffset ≠ 0 then
                // Previously determined to be an intended recipient.
                Process packet using signature at sigOffset position;
            else // Local node is not an intended recipient.
                Discard the packet;
        else
            sig ← sig of a packet using negotiated key for linkID;
            if sig appears in the list of sigs in this packet then
                sifOffset ← offset of this sig in the packet header;
                DestSetTable[DestSetHash] ← sigOffset;
                Process this packet normally;
            else
                DestSetTable[DestSetHash] ← 0;
                Discard the packet;
}
```

QoS Measurements

The link layer monitors the cost of sending data across a link. Some common cost metrics include bandwidth, latency, jitter, reliability, congestion, and actual monetary expense (for example, a network may lease the use of a satellite link). The circuit layer uses this data to establish circuits that satisfy user-specified QoS requirements.

getQos( )

The $getQos_{(\ )}$ function returns a set of QoS metrics. The metrics returned are implementation-specific.

Packet Delivery

Packets are delivered to higher protocol layers through a call to ReceivePacket (see FIG. 3). If a packet has its Type field set to test packet or advertisement (see Table 2 and the section "Packet Information Section of the Link Data Packet"), the link data layer calls ReceivePacket in the routing layer. If a packet has a type field set to one of the circuit-related packet types (see Table 2) then the link data layer calls ReceivePacket in the circuit layer.

CONCLUSION

The link layer protocol creates and manages links, which are direct connections between pairs of CoCo nodes. The link layer detects the presence of neighboring CoCo devices and establishes links to them. Link establishment includes the negotiation of an encoding method and a Diffie-Hellman key exchange so that all communications sent over the link can be secure.

Once a link is established, the link layer relays packets between the network interface layer and higher protocol layers, monitors Quality of Service (QoS) statistics and is able to report these to higher protocol layers. It supports multicasting by suppressing redundant packet transmission across a single network interface, performs fragmentation when packet sizes exceed the network interface Maximum Transmission Unit (MTU), and closes inactive links to free system resources for new link requests.

The link layer uses a Diffie-Hellman key exchange and a work token computation to provide a level of security that is absent from TCP and IP. This protocol is designed specifically for mobile ad hoc networking, and is superior to TCP/IP for this purpose.

The following are possible:
1. A method for establishing links in a heterogeneous communications network that is scalable and dynamic.
2. A method for detecting the presence of other network nodes in communications networks.
3. A method for making links with other network nodes secure. If A and B are two network nodes joined by a link, then when A sends a packet to B, B is guaranteed that only A could have sent it and A is guaranteed that only B can read it.
4. A method to prevent man-in-the-middle attacks. Once a link is established between two nodes A and B, no rogue node is able to interpose itself between A and B and impersonate each to the other. Hence CoCo networks prevent so-called man-in-the-middle attacks.
5. A method to prevent denial-of-service attacks. Any node attempting to flood a network with spurious packets is forced to use significant computational resources. Hence CoCo networks prevent so-called denial of service attacks.
6. A method for monitoring the quality of links in communication networks.
7. A method for using measured link quality to establish circuits satisfying specified QoS requirements in communication networks.
8. A method for assigning uniform addresses (uniform network identifiers) to network nodes in heterogeneous communications networks.
9. A method for nodes to negotiate appropriate security mechanisms during link establishment.
10. A method to support multicasting by suppressing redundant packet transmission across a single network interface.
11. A method to detect when links should be closed.

SEMANTIC CONCEPTS INVOLVED

Link
Bandwidth
Latency
Encryption
Diffie-Hellman key negotiation
Universal Node Identifier
Protocol Abstraction Layer
Denial-of-service prevention
Man-in-the-middle attack prevention
Link setup packets
Round trip time computation
Acknowledgements
Multicasting
Unicasting
Link state machine From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:
1. A non-transitory computer-readable medium having computer-executable instructions operable to enable a first network node to perform a method of establishing a secure communication link with a second network node over which packets may be sent, the method comprising:
   receiving a first link setup packet from the second network node, the first link setup packet including a work token generated by a computation of the second network node and a timestamp corresponding to a time at which the first link setup packet was initiated;
   determining whether the work token has expired based on the timestamp, a current time and a predetermined validity time interval of the work token, wherein the predetermined validity time interval defines a duration that the work token is valid; and
   if the work token has not expired, providing to the second network node a second link setup packet including a key generated by the first network node.
2. The medium of claim 1, further comprising:
   if the work token has expired, ignoring the first link setup packet, wherein no response is returned by the first node to the second node.
3. The medium of claim 1, wherein the method further comprises:
   generating the key.
4. The medium of claim 3, wherein generating the key comprises:
   validating the computation of the second network node.
5. The medium of claim 3, wherein the key is a Diffie-Hellman key.
6. The medium of claim 3, wherein the method further comprises:
   caching the key.
7. The medium of claim 3, wherein the method further comprises:
   determining which of only one of the first network node and the second network node is to apply an encryption method to packets sent over the communication link.
8. A method that enables a first network node to establish a secure communication link with a second network node over which packets may be sent, the method comprising:
   receiving at the first network node a first link setup packet from the second network node, the first link setup packet including a work token generated by a computation of the second network node and a timestamp corresponding to a time at which the first link setup packet was initiated;
   determining at the network node whether the work token has expired based on the timestamp, a current time and a predetermined validity time interval of the work token, wherein the predetermined validity time interval defines a duration that the work token is valid; and
   if the work token has not expired, communicating a second link setup packet from the first network node to the second network node, wherein the second link setup packet includes a key generated by the first network node.
9. The method of claim 8, further comprising:
   if the work token has expired, ignoring the first link setup packet, wherein no response is returned by the first node to the second node.
10. The method of claim 8, wherein the method further comprises:
    generating the key.
11. The method of claim 10, wherein generating the key comprises:

validating the computation of the second network node.

12. The method of claim 10, wherein the key is a Diffie-Hellman key.

13. The method of claim 10, wherein the method further comprises:

caching the generated key.

14. The method of claim 8, wherein the method further comprises:

determining which of only one of the first network node and the second network node is to apply an encryption method to packets sent over the communication link.

15. The method of claim 8, wherein the method further comprises:

checking for the key from a cache of keys, wherein the key is associated with the second network node; and communicating the second link setup packet from the first network node to the second network node when the key is included in the cache of keys.

16. The method of claim 8, wherein the timestamp is a time that the work token was generated.

17. The method of claim 8, wherein the timestamp is a time that the first link setup packet was initiated.

* * * * *